(12) United States Patent
Kelly et al.

(10) Patent No.: US 9,776,634 B2
(45) Date of Patent: Oct. 3, 2017

(54) VEHICLE SPEED CONTROL SYSTEM AND METHOD EMPLOYING TORQUE BALANCING

(71) Applicant: Jaguar Land Rover Limited, Whitley Coventry Warwickshire (GB)

(72) Inventors: James Kelly, Solihull (GB); Daniel Woolliscroft, Birmingham (GB); Andrew Fairgrieve, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/421,929

(22) PCT Filed: Oct. 15, 2013

(86) PCT No.: PCT/EP2013/067123
§ 371 (c)(1),
(2) Date: Feb. 16, 2015

(87) PCT Pub. No.: WO2014/056653
PCT Pub. Date: Apr. 17, 2014

(65) Prior Publication Data
US 2015/0217767 A1   Aug. 6, 2015

(30) Foreign Application Priority Data

Aug. 16, 2012 (GB) .................................. 1214651.0

(51) Int. Cl.
*B60W 30/14* (2006.01)
*B60W 10/184* (2012.01)
(Continued)

(52) U.S. Cl.
CPC .......... *B60W 30/143* (2013.01); *B60K 28/16* (2013.01); *B60K 31/02* (2013.01); *B60K 31/04* (2013.01);
(Continued)

(58) Field of Classification Search
CPC .. B60W 30/143; B60W 10/184; B60W 10/08; B60W 10/06; B60W 30/18063
(Continued)

(56) References Cited

U.S. PATENT DOCUMENTS 5,868,214 A   2/1999   Workman
6,076,036 A   6/2000   Price et al.
(Continued)

FOREIGN PATENT DOCUMENTS

CN           1931643 A        8/2010
DE       102007042128 A1      3/2009
(Continued)

OTHER PUBLICATIONS

International Search Report for application No. PCT/EP2013/067123, dated Feb. 28, 2014, 3 pages.
(Continued)

*Primary Examiner* — Nga X Nguyen
(74) *Attorney, Agent, or Firm* — Reising Ethington P.C.

(57) ABSTRACT

A method for operating a speed control system of a vehicle having a plurality of wheels is provided. The method comprises receiving one or more electrical signals representative of vehicle-related information. The method further comprises determining, based on the one or more electrical signals representative of vehicle-related information, that one or more of the wheels of the vehicle have overcome an obstacle or are about to overcome an obstacle and that therefore a reduction in an applied drive torque to one or more of the wheels of the vehicle by a powertrain subsystem (applied drive torque) will be required to maintain the speed of the vehicle at a target set-speed of the speed control system. The method still further comprises automatically commanding the application of a retarding torque to one or more of the wheels of the vehicle to counteract the effect of (Continued)

an overrun condition in the powertrain subsystem from increasing the speed of the vehicle. A system for controlling the speed of a vehicle comprising an electronic control unit configured to perform the above-described methodology is also provided.

19 Claims, 5 Drawing Sheets

(51) Int. Cl.
| | |
|---|---|
| *B60W 10/08* | (2006.01) |
| *B60K 28/16* | (2006.01) |
| *B60K 31/02* | (2006.01) |
| *B60K 31/04* | (2006.01) |
| *B60T 8/175* | (2006.01) |
| *F16H 61/02* | (2006.01) |
| *B60W 10/04* | (2006.01) |
| *B60W 10/06* | (2006.01) |
| *F16H 59/66* | (2006.01) |

(52) U.S. Cl.
CPC ............. *B60T 8/175* (2013.01); *B60W 10/04* (2013.01); *B60W 10/06* (2013.01); *B60W 10/08* (2013.01); *B60W 10/184* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2550/141* (2013.01); *B60W 2550/147* (2013.01); *B60W 2710/0666* (2013.01); *B60W 2710/182* (2013.01); *B60Y 2200/20* (2013.01); *F16H 59/66* (2013.01); *F16H 2061/0234* (2013.01)

(58) Field of Classification Search
USPC ............................... 701/93, 96, 121, 41, 300
See application file for complete search history.

(56) References Cited

U.S. PATENT DOCUMENTS

| | | | |
|---|---|---|---|
| 2001/0049578 A1* | 12/2001 | Tamura | B60K 31/0008 701/96 |
| 2004/0084237 A1 | 5/2004 | Petrie, Jr. | |
| 2007/0061059 A1* | 3/2007 | Inoue | B60W 10/06 701/41 |
| 2009/0037069 A1 | 2/2009 | Inoue et al. | |
| 2009/0182478 A1* | 7/2009 | Whitney | B60K 6/365 701/93 |
| 2012/0271499 A1 | 10/2012 | Inoue et al. | |

FOREIGN PATENT DOCUMENTS

| | | | | |
|---|---|---|---|---|
| DE | 102009040682 A1 | 3/2011 | | |
| JP | 2001277969 A | 10/2001 | | |
| JP | 2007030581 A | 2/2007 | | |
| JP | 2007077871 A | 3/2007 | | |
| JP | 2007326427 A | 12/2007 | | |
| JP | 2008137442 A | 6/2008 | | |
| JP | 2012222859 A | 11/2012 | | |
| SE | WO 2010144029 A1 * | 12/2010 | ............ B60W 10/06 | |
| WO | 9640534 A1 | 12/1996 | | |
| WO | 2010144028 A1 | 12/2010 | | |
| WO | 2010144029 A1 | 12/2010 | | |
| WO | WO2010146631 A1 | 12/2010 | | |
| WO | 2011002367 A1 | 1/2011 | | |

OTHER PUBLICATIONS

UK Combined Search and Examination Report for corresponding application No. 1314652.7, dated Mar. 26, 2014, 7 pages.
Written Opinion for application No. PCT/EP2013/067123, dated Feb. 28, 2014, 4 pages.
Japanese Notice of Reasons for Rejection, in Japanese with English translation, corresponding to Jp application No. 2015-526997, dated Mar. 8, 2016, 8 pages.
Australian Patent Examination Report corresponding to AU application No. 2013329774, dated Sep. 25, 2015, 4 pages.
English summary of Chinese Office Action for CN application No. 201380049489.5, dated Jun. 28, 2016, 2 pages.

* cited by examiner

VEHICLE SPEED CONTROL SYSTEM AND METHOD EMPLOYING TORQUE BALANCING

TECHNICAL FIELD

The present invention relates generally to vehicle speed control, and more particularly, to a method and system for controlling the speed of a vehicle capable of traversing a variety of different terrains by employing a torque balancing scheme to counteract engine or powertrain overrun.

BACKGROUND

In known vehicle speed control systems, typically referred to as cruise control systems, a set-speed for the vehicle may be initially set by manually bringing the vehicle up to the desired speed and then manipulating a user-selectable user interface device, such as, for example, a pushbutton, to set the prevailing vehicle speed as the set-speed. When the user wants to change the set-speed thereafter, the same or different user input device(s) may be manipulated to increase or decrease the set-speed. In response to a requested or commanded change in set-speed, the speed control system causes the vehicle to accelerate or decelerates as appropriate, to reach or match the new set-speed by sending commands to one or more vehicle subsystems, such as, for example, the powertrain and/or brake subsystems of the vehicle.

Conventional speed control systems are not without their drawbacks, however. For example, white the use of a speed control system designed particularly for on-highway or on-road use at low speeds when driving off-road may offer the user of a vehicle considerable advantages in reduced user workload and enhanced vehicle composure, if the user attempts to negotiate an off-road obstacle such as a boulder field, then the vehicle speed would likely either be too great (typically on-highway/on-road cruise control systems have a minimum set speed of around 30 mph (approximately 50 kph)) or the vehicle engine would likely stall during the extremes of torque requirement necessary to negotiate such an obstacle.

Similarly, while speed control systems designed particularly for use at low speeds when driving, for example, off-road, may also offer the user advantages as it relates to user workload, vehicle composure, and driver comfort, as the vehicle transitions from a environment requiring a relatively large amount of drive torque (e.g., an incline, sand, water, mud, etc.) to an environment requiring a substantially less amount of drive torque (e.g., a decline, a flat surface, pavement, etc.), the vehicle may experience powertrain or engine overrun as the elevated torque demand passes, thereby causing the vehicle speed to exceed the set-speed of the speed control system. For example, as a vehicle is negotiating an obstacle such as a boulder field using a speed control system having a particular set-speed, varying amounts of drive torque will be required to maintain the set-speed depending on, for example, whether the vehicle is ascending a boulder, travelling along the tops of one or more boulders, or descending a boulder. While a relatively large amount of torque may be required to lift the vehicle over a boulder, a much lesser amount will be required as the vehicle crests the boulder, and thus, the drive torque must be appropriately decreased to maintain the vehicle speed at the set-speed. However, due to a lag in the response of an internal combustion engine to changes in torque demand (i.e., torque output lags torque demand), as the vehicle crests the boulder, powertrain or engine overrun may occur thereby causing the speed of the vehicle to at least temporarily exceed the set-speed of the speed control system until the engine or powertrain can reduce the drive torque to an appropriate level. As a result, the driver or user of the vehicle may perceive the vehicle to be lurching over the boulder as opposed to negotiating it at a constant, smooth speed.

Accordingly, there is a need for a speed control system and method for use with the same that minimizes and/or eliminates one or more of the above-identified deficiencies.

SUMMARY

According to an aspect of the present invention for which protection is sought, there is provided a method for operating a speed control system of a vehicle having a plurality of wheels. The method comprises: receiving one or more electrical signals representative of vehicle-related information; determining, based on the one or more electrical signals representative of vehicle-related information, that one or more of the wheels of the vehicle have overcome an obstacle or are about to overcome an obstacle and that therefore a reduction in an applied drive torque to one or more of the wheels of the vehicle by a powertrain subsystem will be required to maintain the speed of the vehicle at a target set-speed of the speed control system; and in response to determining that a reduction in the applied drive torque will be required to maintain the speed of the vehicle at the target set-speed, automatically commanding the application of a retarding torque to one or more of the wheels of the vehicle to counteract the effect of an overrun condition in the powertrain subsystem from increasing the speed of the vehicle.

According to another aspect of the present invention for which protection is sought, there is a provided a speed control system for a vehicle having a plurality of wheels. The system comprises an electronic control unit that is configured to: receive one or more electrical signals representative of vehicle-related information; determine, based on the one or more electrical signals representative of the vehicle-related information, that one or more of the wheels of the vehicle have overcome an obstacle or are about to overcome an obstacle and that therefore a reduction in an applied drive torque to one or more of the wheels of the vehicle by a powertrain subsystem will be required to maintain the speed of the vehicle at a target set-speed of the speed control system; and in response to determining that a reduction in the applied drive torque will be required to maintain the speed of the vehicle at the target set-speed, automatically command the application of a retarding torque to one or more of the wheels of the vehicle to counteract the effect of an overrun condition in the powertrain subsystem from increasing the speed of the vehicle.

According to another aspect of the invention for which protection is sought, there is provided a vehicle having a plurality of wheels comprising the system described herein.

According to a further aspect of the invention for which protection is sought there is provided a carrier medium carrying a computer-readable code for controlling a vehicle having a plurality of wheels to carry out the method of the invention as described herein.

In accordance with one or more examples of one or more aspects of the invention set forth above, there is provided a speed control system operable in, for example, an off-highway condition in which the system commands a powertrain to deliver a required torque (i.e., drive torque) to one or more wheels of the vehicle to maintain a prescribed set-speed over ground, the system being operable automatically to apply a retarding torque to one or more wheels of the vehicle in response to a determination that the vehicle is, for example, cresting an obstacle thereby to counteract powertrain overrun and maintain substantially the set-speed as the vehicle negotiates the obstacle.

The retarding torque may be applied by means of one or more selected from amongst a braking system, an electric machine, a gear shift, or any other suitable means. Accordingly, it is to be understood that the means for applying a retarding torque to one or more wheels may be operable to apply the retarding torque directly to one or more wheels, for example via a brake disc of a wheel, or indirectly, for example by applying the retarding torque to a portion of the powertrain. Thus, in the case of a hybrid vehicle having an electric machine operable as a generator, the off-road speed control system may be operable to apply a retarding torque to the powertrain by means of the electric machine. Other arrangements are also useful.

Embodiments of the invention have the advantage that vehicle composure may be maintained without excessive variation in speed which may give rise to the vehicle body being perceived by an occupant as lurching as the vehicle negotiates an obstacle.

The determination that the vehicle is cresting or otherwise overcoming (e.g., coming out of) an obstacle may be made in response to a signal received by the system indicative of vehicle altitude, for example via a controller area network (CAN) or other suitable data bus, a direct sensor input or any other suitable means. For instance, the system may be operable to detect cresting by one or more wheels of the vehicle for example by reference to one or more of vehicle attitude, changes in vehicle attitude, vehicle suspension articulation (extension or compression) and any other suitable parameter. In addition or instead, cresting may be inferred when a drop-off in respect of required torque is detected following a steep rise in requested torque required to maintain progress.

Optionally the system may be operable to apply a retarding torque to one or more wheels when it is defected that the vehicle is negotiating an obstacle as the vehicle climbs at least a portion of the obstacle before cresting is detected. Further the system may be operable to modulate the amount of retarding torque applied in dependence on a determination that the vehicle is cresting thereby to maintain substantially the set-speed. This feature has the advantage that in some situations vehicle composure may be further enhanced since the powertrain is working against a damping force applied by the retarding force, reducing fluctuations in vehicle speed as the obstacle is negotiated. Further, this damping force acts to mitigate against unwanted flare (slip) of the wheels and enhances vehicle traction over difficult terrain.

It is to be understood that some embodiments of the present invention provide an off-road speed control system with information about the terrain over which the vehicle is driving, as well as the vehicle's attitude, wheel articulation, wheel speed, gear selection, tyre friction, rolling resistance and TR (terrain response) mode. In some embodiments, if a user is using off-road speed control to travel over an obstacle such as walking-holes or steps, the off-road speed control system may supply sufficient torque to overcome the obstacle and deploy (say) the vehicle braking system to provide an appropriate restraining force as the system detects that the demand for torque (in order to maintain a set-speed) is reducing as the vehicle crests the obstacle. The system deploys the retarding force in order to counteract powertrain overrun, preventing the vehicle from unintentionally exceeding the set-speed and maintaining composure and control.

It is to be understood that a retarding torque applied by (say) a vehicle braking system is typically much more responsive in terms of rate of change of torque applied to wheels of the vehicle compared with a powertrain due to lag in the response of an internal combustion engine (ICE) to changes in accelerator pedal or other accelerator input signal (for example a signal from a speed control system). That is, due to the physical nature of an ICE, torque output tends to lag torque demand. In particular, where torque demand goes from high to low, the rotational momentum of the engine holds the torque output artificially high until the engine has time to slow down. Unless the drive is disconnected from the wheels by a clutch or similar means, the response lag of the engine may manifest itself as a vehicle overrun as the vehicle crests over the obstacle, i.e. vehicle speed increases above that which is desired. This may be perceived as the vehicle lurching over the obstacle, causing the vehicle to travel too quickly towards a successive obstacle and/or causing the rear wheel to come into contact with the obstacle aggressively. These characteristics are overcome, or at least mitigated, with an off-road speed control system according to an embodiment of the present invention.

As noted above, the off-road speed control system may be provided with information about a vehicle's attitude as well as one or more of wheel speed, gear selection, tyre friction, rolling resistance, wheel articulation and TR mode. In this way, if the user is using off-road speed control to travel off-road at a slow speed, say 3 mph (approximately 5 kph), when the vehicle is travelling over an obstacle such as a step or over walking-holes, the off-road speed control system can determine when the vehicle has almost crested the obstacle by reference to a rate of change in torque required, and deploy an appropriate retarding torque by means of (say) the braking system in order to overcome engine overrun. In this way, the off-road speed control system according to an embodiment of the present invention may predict that the requested reduction in torque, which may result in the vehicle lurching forwards uncomfortably due to engine overrun, and take steps to counter engine overrun before it adversely affects vehicle composure. Thus if is to be understood that the vehicle may interpret a sudden increase in torque demand in order to maintain progress as an indication that there is likely to be a corresponding sudden decrease in torque required. The speed control system therefore applies a braking system so that the powertrain is working against the action of the braking system. Once the vehicle crests, the amount of brake force can be increased is reduce a risk a user perceives body movement as lurching.

It is to be understood that an off-road speed control system according to an embodiment of the invention may temporarily bring the vehicle to a standstill (or almost to a standstill) in extreme conditions in order to negotiate terrain such as a boulder field with multiple objects over which the vehicle must crest. In such events, the application of the retarding torque (for example by operation of the braking system) may be in response to a cresting event at any of the road wheels, which could otherwise give rise to an overrun situation.

In some embodiments, an off-road speed control system may be operable to control or otherwise influence gear and/or 'high/low' ratio selection, to ensure that the vehicle is travelling at low speeds off-road in a gear appropriate to avoid engine stalling and maintain suitable progress.

In some embodiments, a retarding torque may be applied to one of more wheels to balance demanded engine torque where wheelspin is predicted for said one or more wheels when the engine torque is applied.

In some embodiments, an off-read speed control system may be operable to control or otherwise influence vehicle speed to allow time for adjustment of one or more system configurations. For example to allow time for a change in ride height or tyre pressure or any other suitable parameter, to ensure that the vehicle is travelling with a configuration appropriate to the prevailing terrain. Thus, in the event a vehicle encounters relatively rough terrain the speed control system may stop the vehicle or reduce speed in order to allow ride height adjustment and/or tyre pressure adjustment. In some embodiments the speed control system may reduce vehicle speed rather than stopping the vehicle in order to reduce a risk that the vehicle loses traction and becomes stuck.

If is to be understood that embodiments of the invention may be able to control or otherwise influence operation of a Hill Descent Control (HDC) system of the vehicle, to work with HDC, so as to optimise vehicle composure even when negotiating obstacles on a downhill gradient. In some embodiments a vehicle may be arranged wherein HDC braking commands may override or otherwise take priority over off-road speed control commands if the gradient on which the vehicle is travelling is greater than a prescribed value.

Embodiments of the present invention may also be operable to pre-charge a braking system when a relatively sudden increase in torque is requested. A sudden increase in torque is often followed by a request to decrease powertrain or drive torque and optionally apply braking/retarding torque. Relatively rapid provision of brake/retarding torque is useful in maintaining vehicle composure, particularly when cresting an obstacle.

In some embodiments, the off-road speed control system may intentionally command the powertrain and means for applying a retarding torque to operate together to balance their torque effects on the vehicle and to balance one another, especially as regards any time-lag characteristics associated with the device being operated.

In come embodiments, if the user is using off-road speed control to travel over an obstacle such a walking-holes or steps, the off-road speed control system will supply sufficient torque to overcome the obstacle and apply a different gain or filter value to a rising signal than to a failing signal where the signal is in response to a torque demand from the powertrain and/or means for applying a retarding torque to one or more wheels such as a braking system. This variation in gain compensates for the physical limitations of the system being controlled by the signal, and the off-road speed control system is arranged to balance the control of the means for applying a retarding torque (such as the braking system) with that of the powertrain so as to maintain composure and enhance vehicle performance.

Embodiments of the present invention have the advantage that they may greatly reduce user workload over manual driving and minimise wear and tear on a vehicle by avoiding situations where the vehicle may be caused to contact an obstacle at an unnecessarily high speed. The proposed system is intended to actively monitor torque requirements necessary to overcome an obstacle and to manage known control delays by actively employing a mechanical restraining or damping force to the vehicle to mitigate against overrun after cresting, or otherwise overcoming an obstacle, greatly enhancing vehicle composure during, for example, off-road driving. As noted above, the damping force may be applied by means of a vehicle braking system, electric machine, gear shift or any other suitable means.

DESCRIPTION OF THE DRAWINGS

One or more embodiments of the invention will now be described, by way of example only, with reference to the following figures in which.

DETAILED DESCRIPTION

The method and system described herein may be used to control the speed of a vehicle. In one embodiment, the present method and system receive one or mere electrical signals representative of vehicle-related information and then determine, using the one or more received electrical signals and/or the information represented thereby, whether one or more of the wheels of the vehicle have overcome or are about to overcome an obstacle and that therefore a reduction in an applied drive torque to one or more wheels of the vehicle by a powertrain subsystem will be required to maintain the speed of the vehicle at a particular target set-speed. If it is determined that a reduction in the applied drive torque will be required, the method and system may automatically command the application of a retarding torque to one or more of the wheels of the vehicle to counteract the effect of an overrun condition in the powertrain subsystem from increasing the speed of the vehicle. By doing so, the system and method are operable to, for example, prevent, or at least limit, the degree to which the vehicle speed will exceed the set-speed when, for example, the vehicle overcomes an terrain-related obstacle (e.g., crests a boulder, comes out of a crater, transitions from a high-drag environment to a low-drag environment, etc.).

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
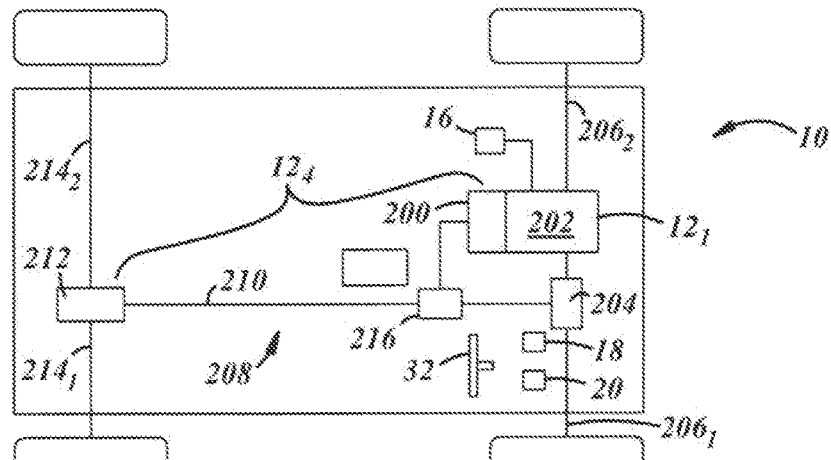
FIG. 1 is a schematic and block diagram of a vehicle.
Figure 2:
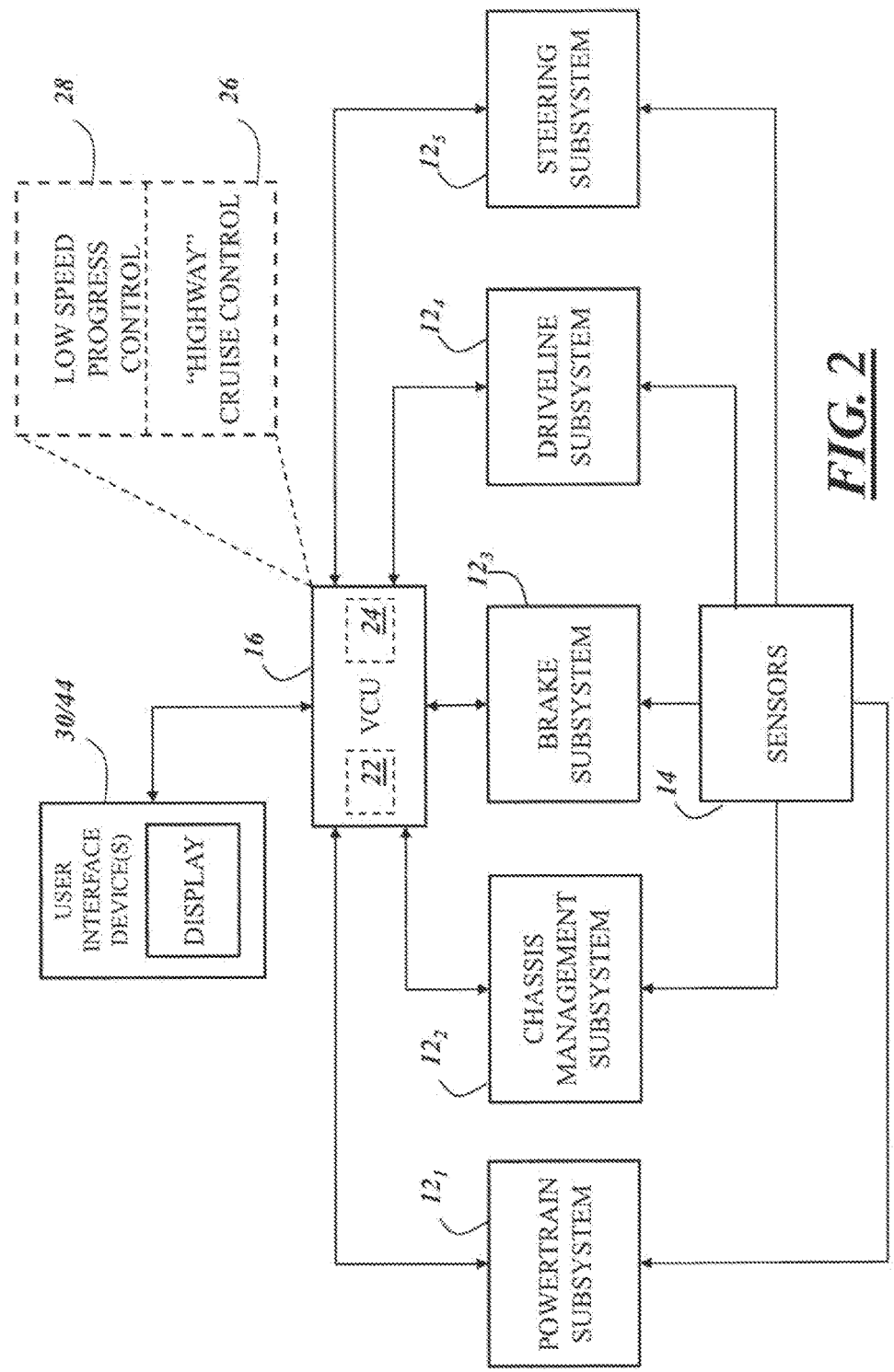
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle 10 may be configured to perform or control various functions and operations relating to the vehicle and, as illustrated in FIG. 2, may include any number of subsystems, such as, for example, a powertrain subsystem $12_1$, a chassis control or management subsystem $12_2$, a brake subsystem $12_3$, a driveline subsystem $12_4$, and a steering subsystem $12_5$, to cite only a few possibilities.

As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In one embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means and may be used for a variety of purposes by one or more components, modules, or subsystems of vehicle 10, in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. For example, in an embodiment, powertrain subsystem $12_1$ may further include one or more electric machines, for example, one or more electric machines operable as electrical generators, that are configured to apply retarding torque to a portion of the powertrain subsystem and/or one or more wheels of the vehicle so as to cause the vehicle to decelerate with or without the use of the brake subsystem (e.g., frictional braking). Accordingly, the present invention is not limited to any one particular powertrain subsystem.

Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or other information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using an air compressor (suspension compressor) onboard the vehicle. Chassis management subsystem $12_2$ may further be configured to monitor the attitude of the vehicle. More particularly, subsystem $12_2$ may receive readings or information from one or more of sensors 14 and/or subsystems 12 described or identified herein (e.g., gyro sensors, vehicle acceleration sensors, etc.) to evaluate the pitch, roll, yaw, lateral acceleration, vibration (e.g., amplitude and frequency) of the vehicle (and/or the vehicle body, in particular), and therefore, the overall attitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_2$ may be configured to control and/or monitor any number of other or additional parameters/aspects of vehicle 10 in the same or similar manner as that described above. As such, the present invention is hot limited to the control and/or monitoring of any particular parameters/aspects. Moreover, it will be further appreciated that chassis management subsystem $12_2$ may be provided according to any number of different embodiments and may include any number of different components, like sensors, control units, and/or any other suitable components known in the art. Accordingly, the present invention is not limited to any one particular chassis management subsystem.

As illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present invention is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this invention, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In one embodiment, one or more of subsystems 12 may be under at least a certain degree of control by VCU 16. In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) of accelerator pedal (pedal 20 in FIG. 1) of vehicle 10). While the description above has been with particular reference to powertrain subsystem $12_1$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s) on, for example, the stability control system (SCS); brake pedal position sensor(s); brake pedal pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s); rather any suitable embodiment may be used.

VCU 16 may compose any suitable ECU, and may include any variety of electronic process devices, memory devices, input/output (I/O) devices, and/or other known components, and perform various control and/or communication related functions. In one embodiment, VCU 16 includes an electronic memory device 22 that may store various information, sensor readings (e.g., such as those generated by vehicle sensors 14), look-up fables or other data structures (e.g., such as those used in the performance of the method described below), algorithms (e.g., the algorithms embodied in the method described below), etc. In an embodiment, memory device 22 comprises a carrier medium carrying a computer-readable code for controlling the vehicle to carry out the method described below. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem 12$_1$), or for example, VCU 16 (as is illustrated in FIG. 2).

Figure 3:
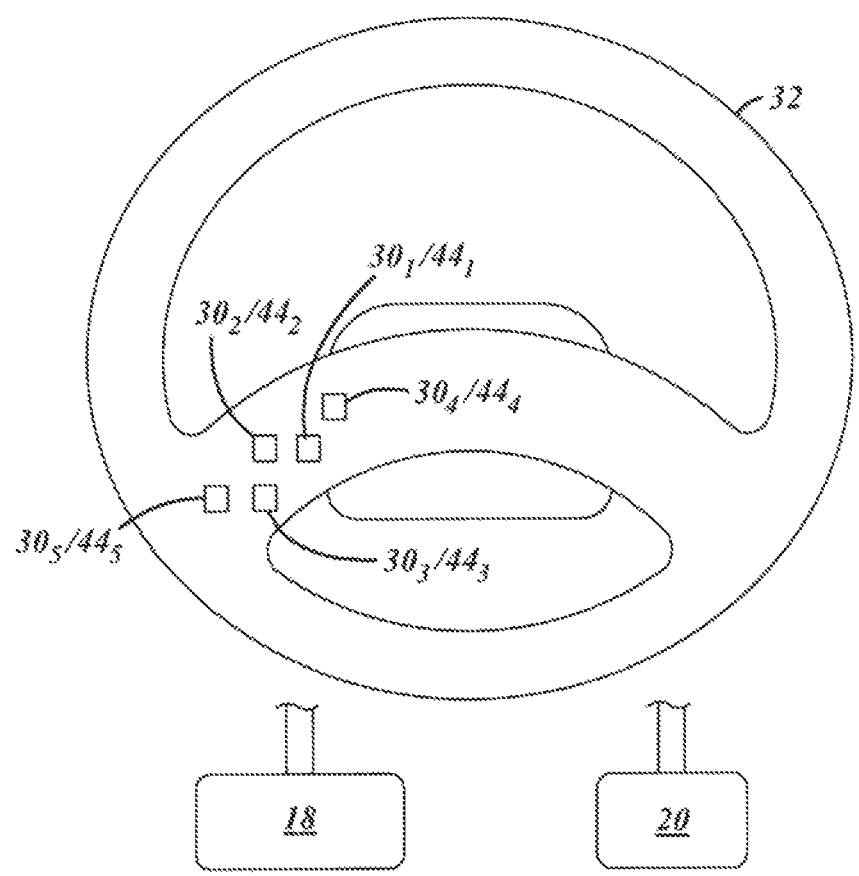
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button 30$_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button 30$_2$ may be provided to allow the user to increase the set-speed in discrete increments (e.g., 1 mph (or 1 kph)), and a "−" button 30$_3$ to allow the user to decrease the set-speed in the same or different discrete increments. Alternatively, the "+" and "−" buttons 30$_2$, 30$_3$ may be integrated into a single user-selectable device. Additional user-selectable interface devices of system 26 may include, for example, a "cancel" button 30$_4$ to deactivate or suspend the system, as well as a "resume" button 30$_5$ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the on-road cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least one embodiment, it is configured in such a way that the speed control function provided thereby is not cancelled or deactivated in response to those events described above. In an embodiment, LSP control system 28 is particularly suited for use in off-road or off-highway driving.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O)

devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: monitoring one or more operational parameters of the vehicle; commanding the application and reduction of drive torque and/or retarding torque to one or more wheels of the vehicle; detecting that a reduction in drive torque is needed to maintain the vehicle speed at a particular target set-speed of LSP control system 28; determining the type and/or characteristics of the terrain over which vehicle 10 is traveling; etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated info VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up fables or other data structures, algorithms, software, and the like, required for performing the functionality of LSP control system 28, including that embodied in the method described below.

As with on-highway cruise control system 26 described above, LSP control system 28 further comprises one or more user interlace devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of pre-defined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in ether embodiments, such as, for example, that described herein, on-highway cruise control system 28 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one illustrative embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based en certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc, of vehicle 10.

Figure 4:
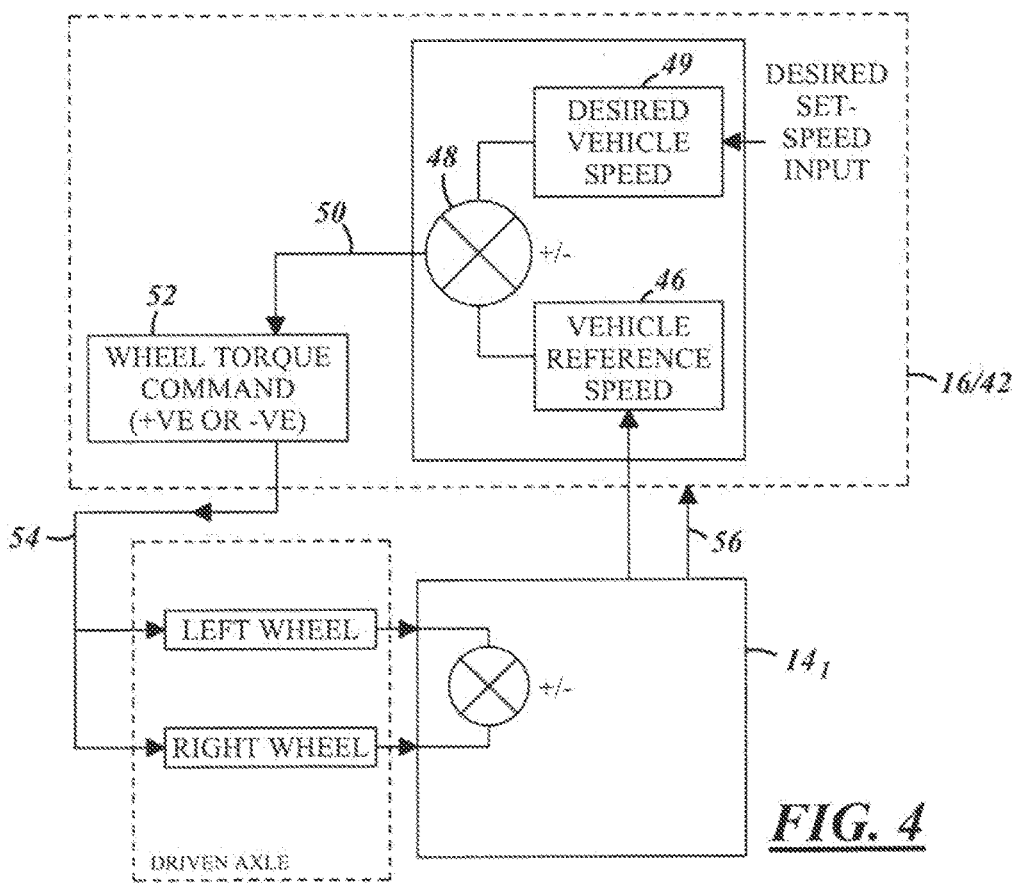
FIG. 4 is a schematic and block diagram illustrating the operation of an example of a speed control system of a vehicle, such as the vehicle illustrated in FIGS. 1 and 2.

More particularly, and with reference to FIG. 4, once the desired set-speed is determined, a vehicle speed sensor (identified as sensor 14, in FIG. 4) associated with the vehicle chassis or driveline provides a signal 48 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed, and in the latter instance, to do so in accordance with a predetermined or prescribed acceleration profile, an acceleration corridor (e.g., +/− (0.1 g-0.2 g)), or both. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels and/or that a braking force is applied to the vehicle wheels, either or both of which may be used to implement the change in torque that is necessary to achieve or maintain the desired vehicle set-speed. Synchronized application of positive and negative torque to the wheels to control the net torque applied thereto is commanded by LSP control system 28 to maintain vehicle stability and composure and regulate torque applied across each axle, in particular, in the event of a slip event occurring at one or more wheel. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, derive, or otherwise determine information relating to the terrain over which vehicle 10 is traveling (e.g., surface type, terrain classification, terrain or surface roughness, etc). In accordance with one embodiment, VCU 16 may be configured to perform this function and to do so in a number of ways. One such way is that described in UK Published Application No. GB2492748A published on 16 Jan. 2013, the entire contents of which are incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In one embodiment, and in addition to the estimator module, a road roughness module may also be inducted for calculating the terrain roughness based on air suspension sensors (the ride height or suspension articulation sensors) and wheel accelerometers. In such an embodiment, a terrain indicator signal in the form of a roughness output signal is output from the road roughness module.

The estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem 12$_2$, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any one particular embodiment or arrangement.

Again, the preceding description of vehicle 10 and the illustrations in FIGS. 1 and 2 are only intended to illustrate one potential vehicle arrangement and to do so in a general way. Any number of other vehicle arrangements and architectures, including these that differ significantly from the one shown in FIGS. 1 and 2, may be used instead.

Figure 5:
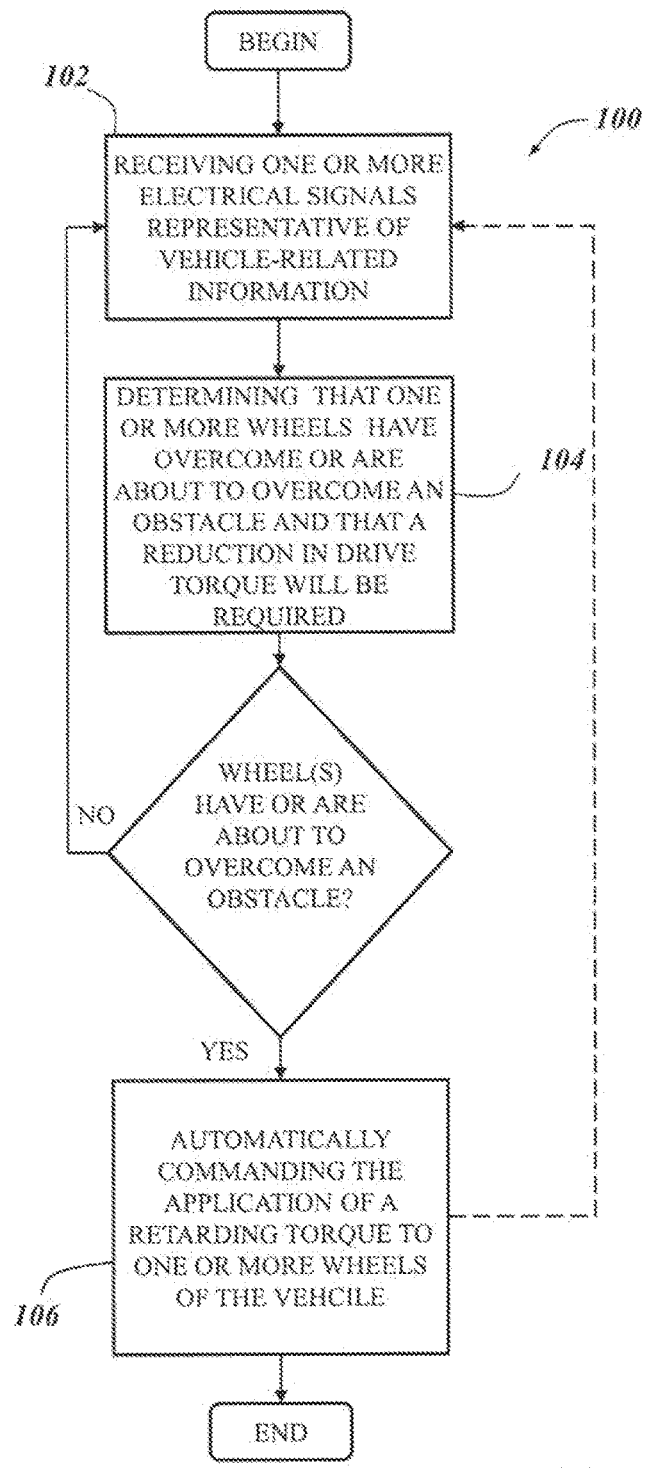
FIG. 5 is a flow diagram of a method for controlling the speed of a vehicle, such as the vehicle illustrated in FIGS. 1 and 2.

Turning now to FIG. 5, there is shown an example of a method 100 for controlling the speed of a vehicle through the operation of a speed control system. For purposes of illustration and clarity, method 100 will be described in the context of vehicle 10 illustrated in FIGS. 1 and 2 and described above. More specifically, method 100 will be described in the context of the low-speed progress (LSP) control system 28 of vehicle 10, which, for purposes of illustration, is integrated in VCU 16 (i.e., VCU 16 comprises ECU 42 of LSP control system 28). It will be appreciated however, that the application of the present methodology is not meant to be limited solely to such an arrangement, but rather method 100 may find application with any number of other speed control system arrangements, including, for example, LSP control systems other than that described above (e.g., not integrated into the VCU of a vehicle, and/or the VCU does not comprise the ECU of the speed control system), as well as, in certain instances, conventional "on-highway" cruise control systems, such as, for example, cruise control system 26 described above. Accordingly, the present invention is not meant to be limited to any one particular arrangement or type of speed control system. Additionally, it will be appreciated that the performance of method 100 is not meant to be limited to any one particular order or sequence of steps.

In an embodiment, the methodology of method 100 is provided to, for example, prevent, or at least substantially limit, the speed of a vehicle exceeding a speed control system target set-speed as the vehicle negotiates terrain-related obstacles, such as, for example, boulders, walking steps, high-drag terrain, and the like. More particularly, method 100 may be used to control the speed of a vehicle as the vehicle overcomes an obstacle and transitions between environments requiring different or varying amounts of drive torque in order to, for example, substantially maintain the target set-speed, or at least minimize the amount by which the vehicle speed exceeds the set-speed due to powertrain or engine overrun, and thus, the adverse effects it has on vehicle composure and/or occupant comfort. For instance, in an embodiment, as a vehicle traverses a boulder field or walking steps, method 100 may be used to counteract powertrain or engine overrun that occurs when the vehicle crests a boulder or step and to thereby maintain the speed of a vehicle at a target set-speed. Similarly, method 100 may be used in much the same way to maintain the speed of a vehicle at a target set-speed as the vehicle transitions from a high-drag terrain or environment (e.g., sand, mud, gravel, etc.) to a low-drag terrain or environment (e.g., pavement).

Accordingly, and with reference to FIG. 5, in an embodiment, method 100 comprises a step 102 of receiving one or more electrical signals representative of vehicle-related information. The electrical signals may originate from any number of sources, including, but not limited to, one or more of vehicle sensors 14, one or more of vehicle subsystems 12, one or more memory devices (e.g., memory device 22 of VCU 16), or any other suitable or appropriate device or component of vehicle 10. Further, the electrical signals may represent a variety of information related to the vehicle, and the operation thereof, in particular, that may be used for the purposes described below.

One type of information that may be represented by the electrical signals received in step 102 is that relating to one or more operating parameters of the vehicle. This may include, for example and without limitation, information related to: longitudinal vehicle acceleration; vehicle speed; wheel speed; vehicle attitude (e.g., pitch, roll, yaw, etc. of the vehicle body, changes in vehicle attitude, etc.); wheel articulation; applied drive torque; applied retarding torque; requested, actual, and rates of changes to drive and/or retarding torque; wheel slip; ride height; tyre pressure; tyre drag; tyre friction; steering wheel angle; lateral vehicle acceleration; terrain response (TR) mode; rolling resistance; gear selection; vehicle suspension articulation (e.g., extension or compression); and/or other parameters influencing vehicle body movement, to cite a few possibilities. The information relating to these parameters that is represented by the received electrical signals may include, for example, particular values or magnitudes of the operating parameters or ether useful information. Electrical signals representative of one or more operating parameters of vehicle 10 may be received from one or more vehicle sensors 14 and/or one or more vehicle subsystems 12, including, but not limited to, those described elsewhere herein or from any other suitable component or device of vehicle 10.

Another type of information may be the type of terrain over which the vehicle is travelling (e.g., snow, water, sand, gravel, boulders, mud, grass, etc.), and/or one or more characteristics of that terrain (e.g., roughness, steepness, etc.). In an embodiment, this information may be received from a subsystem 12 of vehicle 10 that is configured to determine such terrain-related information. For example, the appropriate vehicle subsystem 12 may be queried and the appropriate terrain information (e.g., type/classification, characteristic(s), etc.) may be received therefrom. In another embodiment, this information may already be stored in a memory device of, or accessible by, the component or device configured to perform at least certain steps of method 100, and thus, the information may be received from that memory device. For example, in an instance wherein VCU 16 is configured to perform at least certain steps of method 100, the information may be stored in memory device 22 of VCU 16, and thus, processing device 24 of VCU 16 may receive the information from memory device 22.

Another type of information may be that needed to determine, detect, or sense the type and/or one or more characteristics of the terrain the vehicle is traversing. For example, in an embodiment such as that described above wherein electrical signals representative of one or more operating parameters of vehicle 10 are received, these electrical signals may represent information relating to operating parameters of the vehicle that may be used to determine various types of terrain-related information. These operating parameters may include, for example, those described above with respect to the illustrative processes for determining terrain type/classification and/or characteristics thereof, or other relevant parameters. The received information may be evaluated and used in the manner described above for example, to determine the desired terrain-related information. For instance, in an embodiment wherein VCU 16 is configured to perform at least certain steps of method 100, VCU 16 may receive electrical signals representative of information relating to a variety of operational or operating parameters of the vehicle 10 from one or more vehicle sensors 14 and/or one or more subsystems 12. VCU 16 may then evaluate and use the received information in, for example, the manner described above to determine the desired terrain-related information.

While only certain types of information have been explicitly described above, it will be appreciated that the present invention is not meant to be limited to only those types of information. Rather, information in addition to or instead of that described above may also be acquired or received and used in the same manner as that described in greater detail below. Accordingly, the present invention is not limited to any one or more particular type(s) of information. Additionally, in an embodiment wherein VCU 16 is configured to perform some or all of the steps of method 100, VCU 16 is configured receive the electrical signals representative of vehicle-related information. In other embodiments, however, components of vehicle 10 in addition to, or instead of, VCU 16 may be configured to receive the electrical signals.

As illustrated in FIG. 5, method 100 further comprises a step 104 of determining whether a reduction in a drive torque being applied to one or more wheels of vehicle 10 by the powertrain subsystem $12_1$ ("applied drive torque") will be required to maintain the speed of the vehicle at a target set-speed el a speed control system. For purposes of this invention, maintaining the speed of the vehicle at a target set-speed of the speed control system includes maintaining the vehicle speed exactly at the target set-speed, as well as within a predetermined acceptable amount above or below the target set-speed, such as, for example and without limitation, within 10% above the target set-speed and within 20% below the target set-speed, or a predetermined speed, i.e. a predetermined kilometers per hour, for example 2 kph, above or below the target set speed. It will be appreciated that while particular percentage values above and below the target set-speed have been provided, the present invention is not meant to be limited to such values; rather, any number of other percentages may be used instead depending on the particular implementation. In an embodiment, this determining step is based in whole or in part on the electrical signals received in step 102 that are representative of vehicle-related information. Step 104 may be performed in a number of ways.

In one embodiment, step 104 comprises using the electrical signals received in step 102 to determine whether one or more wheels of vehicle 10 have overcome, or are about to overcome, an obstacle, of the terrain the vehicle is traversing. In such an embodiment, if it is determined that one or more wheels of the vehicle have or are about to overcome a terrain-related obstacle, the speed control system may further determine that a reduction in an applied drive torque will be required to maintain the speed of the vehicle at a target set-speed. This determination may be made using numerous techniques.

One such technique involves using one or more of the electrical signals received in step 102 to monitor the rate of change in the requested or applied drive torque. More particularly, in an embodiment, the requested drive torque may be monitored and if it is sensed that a sudden reduction in the applied drive torque has been requested following a sudden, steep rise in the applied drive torque, it may be determined that one or more wheels of the vehicle are overcoming (or have overcome) a terrain-related obstacle. It will be appreciated that for a rise or reduction in the requested or applied drive torque to be considered "steep," the rise or reduction may be an increase or decrease, respectively, of at least particular percentage of the previously requested or applied drive torque, for example, an increase of more than 20% (e.g., which may comprise more than 30%, more than 40%, or more than 50%, for example) over or under, as the case may be, the previously requested or applied drive torque value over a predetermined time period. The time period may be dependent upon the speed of the vehicle but could, for example, be less than (5) seconds, less than three (3) seconds, or less than two (2) seconds. Shorter time periods may be used with higher speeds than with lower speeds. The rise rate requested for the driver torque may be adapted to best suit the terrain over which the vehicle is travailing, and as such, the maximum increase in drive torque may be capped or otherwise limited in dependence on the prevailing conditions or an operating parameter such as, for example: terrain program or mode; vehicle attitude; steering angle; or any other suitable limiting factor, and as such, the increase in drive torque requested may be 20% or more over the previously requested torque value at a rate of increase equivalent to a substantial proportion of the capped torque increase rate. For example, assume that vehicle 10 has a mass of approximately 2,000 kg (4,400 lbs), a rolling radius of approximately 0.38 m (15 in), and travels along a relatively flat and smooth terrain before climbing a step having a height of 4 in approximately 0.1 m (4 in). The increase in drive torque required at the vehicle wheel climbing the step to lift the vehicle up the step, whilst maintaining a given set-speed may be on the order of 295 lb ft approximately 400 Nm (295 lb ft) increase over say approximately 100 Nm 174 lb ft) that may have been required to make progress over the relatively flat and smooth surface preceding the negotiation of the step. Accordingly, as the vehicle crests the step, a much smaller torque will be required to propel the vehicle at the target set-speed, and thus, the applied drive torque will need to be reduced. In response to such a reduction or requested reduction in the applied drive torque that follows a steep rise in the applied drive torque, a determination can be made that one or more wheels of the vehicle have or are about to overcome the obstacle the vehicle is negotiating (e.g., cresting or transitioning from a high-drag surface to a low-drag surface), and therefore, that the applied drive torque, unless quickly reduced, will cause the vehicle speed to exceed the set-speed. It will be appreciated that the actual torque values (i.e., rise and reduction in applied drive torque) will be dependent upon the particular vehicle, as vehicles of different sizes may require different amounts of torque.

In another embodiment, the determination that one or more wheels of vehicle 10 have overcome or are about to overcome an obstacle the vehicle is negotiating may be made by monitoring one or more operating parameters of the vehicle that is/are represented by the electrical signals received in step 102, and then determining whether one or more vehicle wheels have or are about to overcome an obstacle based at least in part on the monitored operating parameters. More particularly, one or more monitored operating parameters may be, for example, compared to one or more corresponding threshold values or ranges, and depending on whether the monitored operating parameter meets, exceeds, or falls below the given threshold or range, a determination can be made as to whether one or more wheels of the vehicle are overcoming (or have overcome) an obstacle the vehicle is negotiating. In an embodiment, these operating parameters may include those related to the attitude of the vehicle (e.g., pitch, yaw, roll, etc.) or change in the attitude of the vehicle, vehicle suspension articulation (i.e., extension or compression), and/or any other suitable parameter.

In one particular embodiment, the monitored operating parameter is the longitudinal acceleration of vehicle 10. In this embodiment, step 104 comprises monitoring the longitudinal acceleration of vehicle 10 and then determining whether one or more wheels of the vehicle have overcome, or are about to overcome, an obstacle based at least in part thereon. More particularly, in an embodiment, the longitudinal acceleration of the vehicle and the applied drive torque at one or more wheels of the vehicle may be monitored in view of prescribed acceleration profile. Both the longitudinal acceleration and the applied drive torque may be monitored using the information or readings received, or acquired, in step 102 from one or more vehicle sensors 14 (e.g., wheel speed sensors, longitudinal acceleration sensors, vehicle speed sensors, etc., in the case of the longitudinal acceleration; and torque sensors, in the case of the torque), one or mom vehicle subsystems 12 (e.g., powertrain subsystem 12₁), and/or any other suitable component of vehicle 10. If, at a given applied drive torque, the longitudinal acceleration tracks or is in-line with the acceleration profile, such that the vehicle speed will be maintained at the desired or target set-speed, it can be determined that the vehicle is accelerating as expected, and thus, it can be determined that none of the wheels of the vehicle have or are about to overcome an obstacle. Conversely, however, if the longitudinal acceleration of the vehicle exceeds that which is expected from the profile (or at least exceeds the profile by more than a predefined acceptable amount or for a more than a predetermined amount of time), then it may be determined that the one or more wheels of the vehicle have or are about to overcome an obstacle.

In yet another embodiment, the monitored operating parameter is the speed of the vehicle. In this embodiment, step 104 comprises monitoring the speed of the vehicle in view of the set-speed and then determining whether one or more wheels of the vehicle have or are about to overcome an obstacle based at least in part thereon. More particularly, the speed of the vehicle may be monitored using the information or readings received or acquired in step 102 from one or more vehicle sensors 14 (e.g., wheel speed sensors, vehicle speed sensors, etc.), one or more vehicle subsystems 12 (e.g., powertrain subsystem 12₁), and/or any other suitable component of vehicle 10. If the speed of the vehicle matches the set-speed of the speed control system (or is at least less within a predetermined tolerance), it can be determined that the vehicle is operating at, or sufficiently close to, the set-speed, and thus, it can be determined that none of the wheels of the vehicle have or are about to overcome an obstacle. Conversely, however, if the vehicle speed exceeds the set-speed (or does so by at least a certain amount and/or for at least a certain amount of time), then if may be determined that one or more wheels of the vehicle have or are about to overcome an obstacle.

Accordingly, in an embodiment, one or more operating parameters may be monitored and evaluated using techniques known in the art to determine whether one or more wheels of the vehicle are overcoming (or have overcome) an obstacle the vehicle is negotiating.

In another embodiment, the determination that one or more wheels of vehicle 10 have or are about to overcome an obstacle the vehicle is negotiating may be made by monitoring information relating to the terrain the vehicle is traversing using the electrical signals received in step 102, and then determining whether one or more vehicle wheels have or are about to overcome an obstacle based at least in part on the monitored terrain-related information. More particularly, in an embodiment, step 104 may comprise sensing or determining a change in the terrain the vehicle is traversing, and in response thereto, determining whether one or more wheels of the vehicle have or are about to overcome an obstacle. In such an embodiment, a terrain-related change may be sensed using, for example, some or all of the electrical signals received in step 102, and in certain instances, the electrical signals received in step 102 in conjunction with the techniques described above for determining terrain classification/type and/or characteristics thereof.

For example, using electrical signals received in step 102 that represent either an identification of a particular terrain type/classification or information relating to operating parameters corresponding to the leading wheels of the vehicle that may be used to derive a type/classification of the terrain, a determination can be made that the vehicle is transitioning from one type of terrain (e.g., sand) to another (e.g., flat rock). Using a look-up table or other data structure stored in a memory device (e.g., memory device 22 of VCU 16) that correlates terrain type/classification and set-speed with drive torque, the drive torque required to propel the vehicle at the desired or target set-speed over the new terrain can be determined, and then based on this determination, a further determination can be made as to whether the currently applied drive torque exceeds that required to maintain the set-speed of the vehicle over the new terrain. If the current applied drive torque exceeds the required drive torque for the new terrain, or at least exceeds it by a predetermined amount, if may be determined that one or more wheels of the vehicle have or are about to overcome a terrain-related obstacle.

In other embodiments, in addition to, or instead of, basing the determination on the change in the classification or type of terrain, the determination may be based on, for example, a change in a particular characteristic of the terrain (e.g., grade, surface roughness, deformability, etc.). For example, using electrical signals received in step 102 that represent either an identification of a characteristic of the terrain or information relating to operating parameters corresponding to the leading wheels of the vehicle that may be used to derive a characteristic of the terrain, a determination can fee made that the vehicle is transitioning from a terrain having one characteristic (e.g., an incline) to the same terrain having a different characteristic (e.g., a decline, flat area, etc). Using a look-up table or other data structure stored in a memory device (e.g., memory device 22 of VCU 16) that correlates terrain characteristics and set-speed with drive torque, the drive torque required to propel the vehicle at the desired or target set-speed over the new terrain can be determined, and then based on this determination, a further determination can be made as to whether the currently applied drive torque exceeds that required to maintain the set-speed of the vehicle over the new terrain characteristic. If the current applied drive torque exceeds the required drive torque for the new terrain characteristic, or at least exceeds it by a predetermined amount, it may be determined that one or more wheels of the vehicle have or are about to overcome a terrain-related obstacle. Accordingly, it will be appreciated that various types of terrain-related information may be used to perform step 104, including, but not limited to, that described above.

In an instance wherein terrain-related information is used in step 104 in the manner described immediately above, step 104 may comprise: monitoring, using the one or more electrical signals representative of vehicle-related information, one or mere operating parameters of the vehicle and/or information relating to the terrain the vehicle is traversing; sensing a change in the terrain the vehicle is traversing based at feast in part on the monitored operating parameters and/or information relating to the terrain the vehicle is traversing; and determining that one or mom wheels of the vehicle have or are about to overcome an obstacle and therefore a reduction in the applied drive torque will be required to maintain the speed of the vehicle at the target set-speed of the speed control system based at least in part on the sensed terrain change.

Skilled artisans will be appreciate that while certain examples of techniques for determining whether one or more wheels of a vehicle have or are about to overcome an obstacle the vehicle is negotiating, techniques other than those described above may also be utilized These techniques may involve the use of various types of vehicle-related information in addition to, or instead of, that described above, such as, for example, information relating to various additional or alternative operating parameters of the vehicle (e.g., parameters relating to, for example, vehicle ride height, gear ratio of the vehicle driveline (e.g., PTU or transmission), wheel slip or spin, tyre pressure, the particular mode in which the vehicle is operating (e.g., terrain mode), etc.), may be evaluated and used in the performance of step 104. Accordingly, the present invention is not intended to be limited to the use of any particular information. In an embodiment, the functionality of step 104 may be performed by VCU 16, and, for example, as part of the operation of a PID controller embodied in software therein, in particular, while in other embodiments, it may be performed by another suitable component of vehicle 10. Accordingly, the present invention is not limited to the performance of step 104 by any one particular component or device of vehicle 10.

If it is determined or detected in step 104 that none of the wheels of the vehicle have or are about to overcome an obstacle the vehicle is negotiating, in an embodiment, method 100 loops back to step 102 and the methodology is repeated in the manner described above. If, however, it is determined or defected in step 104 that one more wheels of the vehicle have or are about to overcome an obstacle, method 100 moves to step 106, which comprises automatically commanding the application of a retarding torque to one or more of the vehicle wheels. The commanded retarding torque is intended to counteract any engine or powertrain overrun and the attendant effect said overrun may have on the speed of the vehicle; in other words, the retarding torque is operative to counteract the effect of an overrun condition in the powertrain subsystem of the vehicle from increasing the speed of the vehicle (e.g., to maintain the vehicle speed substantially at or below the target set-speed, for example). In an embodiment, the application of a retarding torque in step 106 is done in conjunction with a commanded reduction in the applied drive torque (e.g., an increase in the rate at which the applied drive torque is decreased or reduced), and thus, in at least certain instance, step 106 may comprise balancing the application of a retarding torque with the reduction in the applied drive torque. One reason that reducing the applied drive torque (or increasing the rate of drive torque decrease) may not in and of itself be enough to prevent or at least substantially limit the exceeding of the target set-speed is that there is typically a lag in the response of an internal combustion engine to changes in speed-control signals. More particularly, due to the physical nature of the internal combustion engine, torque output tends to lag torque demand. For instance, when torque demand goes from high to low, the rotational momentum of the engine holds the torque output artificially high until the engine has time to slow down. Unless the engine is disconnected from the wheels by clutch or other similar means, the response lag of the engine may manifest itself as powertrain or engine overrun as the vehicle overcomes an obstacle. While the powertrain/engine of the vehicle is typically slow to respond, the application of a retarding torque is typically much more responsive, and therefore, may be used to counteract a powertrain overrun condition.

Step 106 may comprise commanding the application of a retarding torque from one or more of a number of sources. For example, in an embodiment, brake subsystem $12_3$ of vehicle 10 may be commanded to apply a retarding torque to one or more wheels of vehicle 10. If appropriately configured, powertrain subsystem $12_1$ may also or alternatively be commanded to apply a retarding torque indirectly to one or more wheels of vehicle 10. More particularly, in an embodiment wherein powertrain subsystem $12_1$ includes one or more electric machines, for example, one or more electric machines operable as electrical generators, that are configured to apply retarding torque to a portion of the powertrain subsystem and/or one or more wheels of the vehicle so as to cause the vehicle to decelerate with or without the use of the brake subsystem, powertrain subsystem $12_1$ may be commanded to apply the retarding torque. In other embodiments, components other than the brake and powertrain subsystems of vehicle 10 may be utilized, including, for example and without limitation, a hill descent control (HDC) system of the vehicle, the driveline or transmission of the vehicle (e.g., a gear shift or change in gear ratio), etc. Accordingly, it will be appreciated that the present invention is not limited to any particular source of retarding torque, rather any number of source(s), either alone or in combination, may be utilized to apply, or cause to be applied, a retarding torque to one or more wheels of vehicle 10.

The particular amount of retarding torque that is commanded to be applied (and the rate at which it is achieved or applied (i.e., increased)) in step 106 may be dependent upon any number of factors. These factors may include, for example, the particular amount or magnitude of the applied drive torque being applied to the wheels, the magnitude of the required reduction in the applied drive torque that will be required, and the amount by which the longitudinal acceleration of the vehicle diverges from an expected acceleration defined by a prescribed acceleration profile (i.e., the greater the divergence, the greater the retarding torque and rate at which it is applied/increased), for example. The magnitude and/or rate of retarding torque may be determined using, for example, a look-up table or other data structure or profile, using a closed loop control system (e.g., PID controller embodiment in software in the component performing step 106), or in any other suitable way.

In an embodiment, the automatic commanding of the application of retarding torque in step 106 comprises automatically commanding the application of a retarding torque to one or more wheels of the vehicle to counteract the effect of an overrun condition in the powertrain subsystem that is applying drive torque to the one or more wheels so as to maintain the speed of the vehicle at a target set-speed of the speed control system. As described above, this may comprise maintaining the speed of the vehicle exactly at the target set-speed, or within an acceptable range above or below the target set-speed such that the vehicle speed is maintained substantially at the target set-speed.

In another embodiment, the automatic commanding of the application of retarding torque in step 106 comprises automatically commanding the application of a retarding torque to one or more wheels of the vehicle to temporarily reduce the speed of the vehicle below the target set-speed by a predetermined amount, and thereafter controlling the powertrain subsystem and the application of the retarding torque, to bring the vehicle speed back up to (i.e., resume) the target set-speed. This may be advantageous in an instance where the vehicle is negotiating an extremely steep obstacle and the user is not able to see what is on the other side of the obstacle. By temporarily slowing the vehicle to a speed below the target set-speed, the user is better able to survey or observe the conditions before progressing at the target set-speed. Accordingly, the length of time the vehicle speed is reduced below the target set-speed may a period of time that is sufficient for these purposes, and therefore, may be on the order of a few seconds to tens of seconds, for example. Additionally, the particular amount the vehicle speed is reduced may be a predefined value (e.g., a certain mph (kph) value), or alternatively may be a particular percentage of the target set-speed (e.g., 10-50%, for example). Accordingly, the present invention is not limited to any one particular value or by or to which the vehicle speed is reduced.

While certain schemes for commanding and applying retarding torque have been described with particularity above, it will be appreciated that any number of schemes may be implemented, including schemes other than those described above. Accordingly, the present invention is not meant to be limited to any particular retarding torque command and application scheme(s). In an embodiment, the functionality of step 106 may be performed by VCU 16, and, for example, as part of the operation of a PID controller embodied in software therein, in particular, while in other embodiments, it may be performed by another syllable component of vehicle 10 either alone or in combination with VCU 16. Accordingly, the present invention is not limited to the performance of step 106 by any one particular component or device of vehicle 10.

Following the application of a suitable retarding torque commanded in step 106, and once it has been determined that the vehicle has cleared or negotiated the obstacle (e.g., crested a boulder, come out of crater, fully transitioned from a high-drag to low-drag environment), the retarding torque commanded to be applied in step 106 may be reduced (e.g., to substantially zero) and the applied drive torque may settle at a value sufficient to maintain the speed of the vehicle at the target set-speed of the speed control system.

In addition to the above, method 100 may also include a number of additional steps. For example, in an embodiment, prior to steps 104 and/or 106, the method may comprise a step (not shown) of causing (e.g., commanding) the application of a predefined baseline or threshold retarding torque to one or more wheels that serves, for example, as a damping force against which the powertrain acts in propelling the vehicle. The particular magnitude of the predefined retarding torque will be dependent upon, for example, the particular vehicle, as different sizes of vehicles will require different magnitudes of torque. However, in an embodiment, the magnitude of the predefined retarding torque will be a magnitude that is sufficient, for example, to just bring the pads and disks of the brake subsystem into contact (e.g., nominally around 3 bar). In an embodiment the predefined baseline retarding torque may be applied whenever the speed control system is active. Alternatively, it may be applied only in response to one or more conditions that may be detected using, for example, the electrical signals received in step 102. These conditions may include, but are not limited to, a determination that an obstacle is being negotiated (e.g., boulder, step, etc.), a determination that the acceleration of the vehicle is exceeding an expected acceleration defined by a prescribed acceleration profile, and/or a determination that there has been a requested or actual sudden and/or steep rise in the applied drive torque, to cite a few possibilities. In an embodiment wherein a threshold or baseline retarding torque is applied as described above, step 106 would comprise commanding the application of a retarding torque to one or more wheels of the vehicle by commanding an adjustment to that predefined threshold or baseline applied retarding torque. One advantage of such an embodiment is that the brake subsystem will already be active when step 106 is performed, thereby making the system more responsive and the speed control more precise. In an embodiment, the functionality described above may be performed by VCU 16, while in other embodiments it may be performed by another suitable component of vehicle 10 either alone or in combination with VCU 16. Accordingly, the present invention is not limited to the performance of this step by any one particular component or device of vehicle 10.

Method 100 may additionally or alternatively include a step (not shown) of priming or charging (or commanding the priming or charging of) the brake subsystem of the vehicle prior to one or both of steps 104 and 106. In other words, the speed control system may command the brake subsystem to prepare to apply a retarding torque to one or more wheels of the vehicle. In an embodiment, the brake subsystem may be primed in response to a detested condition. For example, the brake subsystem may be primed in response to an increase in the applied or requested drive torque in excess of a predetermined rate, which may be an empirically derived and may be, for example, vehicle type-dependent. For example, if the detected increase constitutes a sudden, steep rise in the applied torque as described above, a prediction may be made that a sudden, steep decrease in the requested or applied torque may be imminent, and therefore, the brake subsystem may be primed in anticipation for the need to apply a retarding torque. One advantage of such an embodiment is that the brake subsystem will be ready to operate when commanded to in step 106, thereby making the system more responsive and the speed control more precise. In an embodiment, the functionality described above may be performed by VCU 16, while in other embodiments if may be performed by another suitable component of vehicle 10 either alone or in combination with VCU 16. Accordingly, the present invention is not limited to the performance of this step by any one particular component or device of vehicle 10.

In an instance where a retarding torque is commanded in step 106, in one embodiment, method 100 ends following the commanding of the retarding torque; in another embodiment, however, method 100 is iterative. In an embodiment where method 100 is iterative, following step 106 method 100 loops back to step 102 and the methodology is repeated as described above. Such an iterative or continuous process allows for precise control over the speed of the vehicle.

Figure 6:
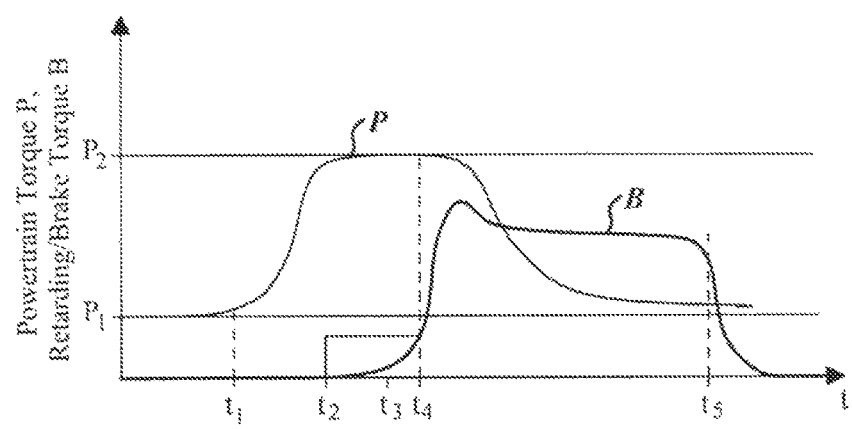
FIG. 6 is a plot of powertrain drive torque and retarding or brake torque as a function of time in a vehicle, such as the vehicle illustrated in FIGS. 1 and 2, over the course of a portion of an example journey.

With reference to FIG. 6, and in order to provide a better understanding of various aspects of the present invention described above, a non-limiting example or scenario of method 100 will now be described to illustrate the application of some or ail of the above-described aspects. FIG. 6 shows a plot of an amount of drive torque (plot P) and retarding or brake torque (plot B) developed by the powertrain and brake subsystems of a vehicle, respectively, according to an embodiment of the present invention as the vehicle negotiates an obstacle such as a boulder or step.

At time $t<t_1$ the vehicle is moving over relatively flat terrain with the powertrain developing torque $P_1$. At time $t=t_1$ the vehicle encounters the obstacle. The speed control system detects that the speed of the vehicle falls as a result of the increased resistance to motion presented by the obstacle and automatically demands an increase in the output from the powertrain subsystem to maintain the vehicle set-speed. In some embodiments the speed control system temporarily reduces the maximum allowable value of set-speed due to detection of the presence of the obstacle. This speed may be less than the driver set-speed in some scenarios.

At time $t=t_2$ the speed control system can determine that the increase in required powertrain drive torque P is consistent with climbing of an obstacle and triggers priming of the vehicle brake subsystem. As described above, this is in order to prepare the brake subsystem for relatively rapid deployment if and when cresting is subsequently detected. At time $t=t_3$ the speed control system commands relatively gentle actuation of the brake subsystem in order to provide a small amount of resistance to vehicle motion and reduce an amount of acceleration of the vehicle body if the vehicle subsequently crests over the obstacle and begins to descend the other side thereof. At time $t=t_4$ an increase in vehicle speed consistent with cresting is defected and the speed control system immediately commands a reduction in the amount of drive torque P developed by the powertrain subsystem. The speed control system also commands actuation of the brake subsystem to increase the amount of brake or retarding torque B and reduce an amount by which a speed of the vehicle increases due to powertrain response lag following the commanded reduction in powertrain drive torque P.

Once the vehicle has cleared or negotiated the obstacle, at time $t=t_5$ the speed control system commands a reduction in the brake or retarding torque B to substantially zero and the powertrain drive torque P settles at a value sufficient to sustain vehicle speed at the prevailing set-speed.

It will be appreciated in view of the above that a benefit of the present system and method, among others, is that the speed of a vehicle may be maintained at, or very close to, a target set-speed as the vehicle traverses, for example, an obstacle. As result of this precise speed control, vehicle composure is may be maintained and vehicle occupant comfort may be enhanced.

It will be understood that the embodiments described above are given by way of example only and are net intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of operating a speed control system of a vehicle having a plurality of wheels, comprising:
  receiving one or more electrical signals from one or more sensors, the electrical signals being representative of vehicle-related information;
  maintaining a target set-speed while traversing an obstacle by increasing an applied drive torque to one or more of the wheels of the vehicle;
  determining, based on the one or more electrical signals representative of vehicle-related information, that at least one of the wheels of the vehicle have overcome the obstacle or are about to overcome the obstacle and that therefore an overrun condition in a powertrain subsystem is likely to occur for which a reduction in an applied drive torque to the one or more of the wheels of the vehicle by a powertrain subsystem will be required to prevent the speed of the vehicle from exceeding the target set-speed of the speed control system; and
  in response to determining that the at least one of the wheels of the vehicle have overcome or are about to overcome the obstacle, while maintaining positive powertrain torque to the wheels of the vehicle simultaneously automatically commanding the application of a retarding torque to one or more of the wheels of the vehicle to counteract the effect of the overrun condition in the powertrain subsystem from increasing the speed of the vehicle.

2. An electronic control unit (ECU) for controlling the speed of a vehicle having a plurality of wheels, the ECU configured to:
  receive one or more electrical signals from one or more sensors, the electrical signals being representative of vehicle-related information;
  maintain a target set-speed while traversing an obstacle by increasing an applied drive torque to one or more of the wheels of the vehicle;
  determine, based on the one or more electrical signals representative of vehicle-related information, that at least one of the wheels of the vehicle have overcome the obstacle or are about to overcome the obstacle and that therefore an overrun condition in a powertrain subsystem is likely to occur so that a reduction in an applied drive torque to the one or more of the wheels of the vehicle by a powertrain subsystem will be required to prevent the speed of the vehicle from exceeding the target set-speed of the speed control system; and
  in response to determining that the at least one wheels of the vehicle have overcome or are about to overcome the obstacle, while maintaining positive powertrain torque to the wheels of the vehicle simultaneously automatically command the application of a retarding torque to one or more of the wheels of the vehicle to counteract the effect of the overrun condition in the powertrain subsystem from increasing the speed of the vehicle.

3. The electronic control unit (ECU) of claim 2, wherein the ECU is configured to automatically command the application of a retarding torque by automatically commanding the application of a retarding torque to one or of the more of the wheels of the vehicle to counteract the effect of the overrun condition in the powertrain subsystem so as to maintain the speed of the vehicle at a target set-speed.

4. The electronic control unit (ECU) of claim 2, wherein the ECU is configured to automatically command the application of a retarding torque by automatically commanding the application of a retarding torque to temporarily reduce the speed of the vehicle below a target set-speed, and thereafter controlling the powertrain subsystem and the application of the retarding torque to resume the target set-speed.

5. The electronic control unit (ECU) of claim 2, wherein the ECU is configured to determine that the at least one wheels of the vehicle have overcome or are about to overcome an obstacle by:
  monitoring the one or more electrical signals representative of vehicle-related information to determine a requested reduction in the applied drive torque following a rise in the applied drive torque above a predetermined value or rate; and determining that the at least one wheels of the vehicle have or are about to overcome an obstacle based at least in part on the requested reduction in the applied drive torque.

6. The electronic control unit (ECU) of claim 2, wherein the ECU is configured to determine that one or more wheels of the vehicle have overcome or are about to overcome an obstacle by:

monitoring, using the one or more electrical signals representative of vehicle-related information, one or more operating parameters of the vehicle; and determining that one or more wheels of the vehicle have or are about to overcome an obstacle based at least in part on the one or more monitored operating parameters of the vehicle.

7. The electronic control unit (ECU) of claim 6, wherein the ECU is configured to monitor, using the one or more electrical signals representative of vehicle-related information, the longitudinal acceleration of the vehicle, and to determine that one or more of the wheels of the vehicle have overcome or are about to overcome an obstacle when the longitudinal acceleration of the vehicle exceeds a predetermined acceleration profile.

8. The electronic control unit (ECU) of claim 6, wherein the ECU is configured to monitor, using the one or more electrical signals representative vehicle-related information, the speed of the vehicle, and to determine that one or more of the wheels of the vehicle have overcome or are about to overcome an obstacle when the speed of the vehicle exceeds a target set-speed.

9. The electronic control unit (ECU) of claim 2, wherein the ECU is configured to determine that one or more wheels of the vehicle is overcoming the obstacle by:

monitoring, using the one or more electrical signals representative of vehicle-related information, one or more operating parameters of the vehicle;

sensing a change in the terrain the vehicle is traversing based at least in part on the monitored operating parameters of the vehicle; and determining that one or more of the wheels of the vehicle have overcome or are about to overcome an obstacle based at least in part on the sensed terrain change.

10. The electronic control unit (ECU) of claim 2, wherein the ECU is configured to determine that one or more wheels of the vehicle have overcome or are about to overcome an obstacle:

monitoring, using the one or more electrical signals representative of vehicle-related information, information relating to the terrain the vehicle is traversing;

sensing a change in the terrain the vehicle is traversing based at least in part on the monitored information relating to the terrain the vehicle is traversing; and determining that one or more of the wheels of the vehicle have overcome or are about to overcome an obstacle based at least in part on the sensed terrain change.

11. The electronic control unit (ECU) of claim 2, wherein the ECU is configured to automatically command the application of a retarding torque to the one or more wheels of the vehicle by automatically commanding an increase in a retarding torque being applied to the one or more wheels of the vehicle.

12. The electronic control unit (ECU) of claim 2, wherein the ECU is configured to automatically command the application of a retarding torque to the one or more wheels of the vehicle by automatically commanding one or both of the powertrain subsystem and a brake subsystem of the vehicle to apply a retarding torque to the one or more wheels of the vehicle.

13. The electronic control unit (ECU) of claim 12, arranged for a hybrid vehicle wherein the ECU is configured to automatically command the powertrain subsystem to apply the retarding torque by means of an electric machine.

14. The electronic control unit (ECU of claim 2, wherein prior to automatically commanding the application of a retarding torque to the one or more wheels of the vehicle, the ECU is further configured to cause the brake subsystem of the vehicle to be primed.

15. The electronic control unit (ECU) of claim 14, wherein the ECU is configured to cause the brake subsystem of the vehicle to be primed in response to a detected increase in drive torque in excess of a predetermined rate.

16. The electronic control unit (ECU) of claim 2, wherein in response to detecting that an overrun condition in the powertrain subsystem is likely to occur, the ECU is further configured to automatically command a reduction in the applied drive torque at the one or more wheels of the vehicle.

17. The electronic control unit (ECU) of claim 16, wherein the ECU is further configured to balance the reduction in the applied drive torque at one or more of the wheels of the vehicle with the application of the retarding torque to one or more of the wheels of the vehicle to counteract the effect of the overrun condition in the powertrain subsystem from increasing the speed of the vehicle.

18. A vehicle having a plurality of wheels and comprising an electronic control unit (ECU) for controlling the speed of a vehicle having a plurality of wheels, the ECU configured to:

receive one or more electrical signals representative of vehicle-related information;

maintain a target set-speed while traversing an obstacle by increasing an applied drive torque to one or more of the wheels of the vehicle;

determine, based on the one or more electrical signals representative of vehicle-related information, that at least one of the wheels of the vehicle have overcome the obstacle or are about to overcome the obstacle and that therefore an overrun condition in a powertrain subsystem is likely to occur so that a reduction in an applied drive torque to the one or more of the wheels of the vehicle by a powertrain subsystem will be required to prevent the speed of the vehicle from exceeding the target set-speed of the speed control system; and in response to determining that the at least one wheels of the vehicle have overcome or are about to overcome the obstacle, while maintaining positive powertrain torque to the wheels of the vehicle simultaneously automatically command the application of a retarding torque to one or more of the wheels of the vehicle to counteract the effect of an overrun condition in the powertrain subsystem from increasing the speed of the vehicle.

19. An electronic memory device carrying a computer-readable code that, when executed, is configured to control a vehicle having a plurality of wheels to carry out the method according to claim 1.

* * * * *